United States Patent [19]
Mita et al.

[11] Patent Number: 5,908,702
[45] Date of Patent: Jun. 1, 1999

[54] ULTRAVIOLET RAY ABSORBING COLORED GLASS

[75] Inventors: Setsuko Mita; Toru Kudo; Mizuki Sasage; Shiro Tanii; Takashi Kijima, all of Yokohama, Japan

[73] Assignee: Asahi Glass Company Ltd., Tokyo, Japan

[21] Appl. No.: 08/829,948

[22] Filed: Apr. 1, 1997

[30]   Foreign Application Priority Data

Apr. 2, 1996   [JP]   Japan ..................................... 8-080268

[51] Int. Cl.⁶ ..................................................... B32B 17/00
[52] U.S. Cl. ............................. 428/426; 501/69; 501/70; 501/71
[58] Field of Search ................................. 501/69, 70, 71; 428/411.1, 426

[56]   References Cited

U.S. PATENT DOCUMENTS

| | | | |
|---|---|---|---|
| 5,023,210 | 6/1991 | Krumwiede | 501/71 |
| 5,411,922 | 5/1995 | Jones | 501/71 |
| 5,545,596 | 8/1996 | Alvarez-Casariego | 501/71 |
| 5,558,942 | 9/1996 | Itoh et al. | 428/426 |
| 5,723,390 | 3/1998 | Kijima | 501/70 |
| 5,726,109 | 3/1998 | Ito | 501/70 |
| 5,763,342 | 6/1998 | Mita | 501/64 |
| 5,776,846 | 7/1998 | Sakaguchi | 501/70 |

FOREIGN PATENT DOCUMENTS

| | | |
|---|---|---|
| 0 653 385 | 5/1995 | European Pat. Off. . |
| 0 653 386 | 5/1995 | European Pat. Off. . |
| 6-92678 | 4/1994 | Japan . |
| 2 274 841 | 8/1994 | United Kingdom . |

*Primary Examiner*—Timothy M. Speer
*Attorney, Agent, or Firm*—Oblon, Spivak, McClelland, Maier & Neustadt, P.C.

[57]   ABSTRACT

Ultraviolet ray absorbing colored glass, which comprises 100 parts by weight of a base component consisting of soda lime silicate glass and coloring components consisting essentially of from 0.08 to 0.4 part by weight of total iron as calculated as $Fe_2O_3$, from 0.05 to 0.4 part by weight of vanadium as calculated as $V_2O_5$, from 0.0005 to 0.03 part by weight of Se, from 0 to 0.005 part by weight of CoO, from 0 to 2.0 parts by weight of $TiO_2$ and from 0 to 0.8 part by weight of $CeO_2$.

19 Claims, No Drawings

ULTRAVIOLET RAY ABSORBING COLORED GLASS

The present invention relates to a composition for colored glass which has a high ultraviolet ray absorbing ability and a relatively high visible ray transmittance and exhibits a brown color or gray color tone similar to current colored sheet glass for buildings and vehicles, and which has a relatively low excitation purity and solar radiation transmittance.

Heretofore, dark blue or green colored infrared ray or ultraviolet ray absorbing glass containing a large amount of FeO, $Fe_2O_3$ and $CeO_2$, has been known. Further, it has been known to precipitate semiconductor crystallites to obtain a glass which absorbs ultraviolet rays efficiently. However, the former contains a large amount of iron component, whereby the visible ray transmittance is low, and it is especially difficult to prepare brown colored glass which is currently used for vehicles. On the other hand, the latter has a problem that the semiconductor crystallites can not be formed under a stabilized condition with glasses other than boro silicate glass, and a float process which is a typical process for producing sheet glass can hardly be applicable.

JP-A-6-92678 discloses brown glass having a relatively high ultraviolet ray absorbing ability, which has been prepared by incorporating colorants such as iron, cerium, selenium and nickel to soda lime silicate glass. However, with this glass, if it is attempted to increase the visible ray transmittance, the solar radiation transmittance tends to be high, and the excitation purity tends to be high, such being undesirable for vehicles from the viewpoint of air conditioning and harmony with interior decorations.

U.S. Pat. No. 5,558,942 discloses glass having colorants such as vanadium and manganese incorporated to soda lime silicate glass. However, in this glass, iron and manganese are coexistent, whereby the visible light transmittance may sometimes deteriorate due to solarization under strong ultraviolet rays.

It is an object of the present invention to obtain glass of brown or gray color tone which has characteristics of absorbing ultraviolet rays and sufficiently transmitting visible light rays and which is free from color change by solarization and has a relatively low solar radiation transmittance and excitation purity, by using as a base composition soda lime silicate which is glass for usual buildings or vehicles and by incorporating various colorants in a controlled manner.

The present invention provides ultraviolet ray absorbing colored glass, which comprises 100 parts by weight of a base component consisting of soda lime silicate glass and coloring components consisting essentially of from 0.08 to 0.4 part by weight of total iron as calculated as $Fe_2O_3$, from 0.05 to 0.4 part by weight of vanadium as calculated as $V_2O_5$, from 0.0005 to 0.03 part by weight of Se, from 0 to 0.005 part by weight of CoO, from 0 to 2.0 parts by weight of $TiO_2$ and from 0 to 0.8 part by weight of $CeO_2$.

Now, the present invention will be described in detail with reference to the preferred embodiments.

Firstly, the coloring components will be described.

In the glass composition of the present invention, the content of total iron as calculated as $Fe_2O_3$ is within a range of from 0.08 to 0.4 part by weight, per 100 parts by weight of the base component. If the content of the total iron is less than 0.08 part by weight, per 100 parts by weight of the base component, the effect for absorbing ultraviolet rays tends to be inadequate, and it will be necessary to increase the amount of FeO in order to lower the solar radiation transmittance, whereby the glass tends to have an amber color. If the content of total iron exceeds 0.4 part by weight, per 100 parts by weight of the base component, the visible ray transmittance tends to be low, and the excitation purity tends to increase. Preferably, it is at most 0.2 part by weight, per 100 parts by weight of the base component.

Vanadium is a component having an ultraviolet ray absorbing effect, since it is usually most stably present in glass in a state of $V^{5+}$ and has an absorption band at a near ultraviolet region (350 nm). However, if its amount is less than 0.05 part by weight, per 100 parts by weight of the base component, its effect tends to be small. To obtain an adequate effect, an amount of at least 0.1 part by weight is preferred. On the other hand, if it exceeds 0.4 part by weight, per 100 parts by weight of the base component, the influence for absorption of visible light tends to be large, whereby the visible ray transmittance tends to be low. Preferably, it is at most 0.2 part by weight.

Se is used as a color tone adjusting component to let glass exhibit a brown or a gray color. If the content of Se is less than 0.0005 part by weight, per 100 parts by weight of the base component, its effect tends to be inadequate, and it tends to be difficult to obtain a brown colored glass. If its content exceeds 0.03 part by weight, per 100 parts by weight of the base component, the visible ray transmittance may sometimes tend to be low. Preferably, the content is at most 0.01 part by weight, per 100 parts by weight of the base component.

CoO is not essential, but may be incorporated as a colorant to the glass having the above compositional range, within a range of from 0 to 0.005 part by weight, per 100 parts by weight of the base component, whereby the excitation purity can be lowered, and it becomes possible to adjust the color close to conventional brown colored glass for vehicles or buildings. To secure the effect, its content is preferably at least 0.0005 part by weight, per 100 parts by weight of the base component. If the content of CoO exceeds 0.005 part by weight, per 100 parts by weight of the base component, the visible ray transmittance may sometimes tend to be low. Preferably, the content is at most 0.003 part by weight.

$TiO_2$ is not essential, but may be incorporated as an ultraviolet ray absorbing component to the glass having the above compositional range, within a range of from 0 to 2.0 parts by weight, per 100 parts by weight of the base component. If the content of $TiO_2$ exceeds 2.0 parts by weight, per 100 parts by weight of the base component, it may sometimes be difficult to control the color tone, since it tends to react with co-existing $Fe_2O_3$ and absorb light in the vicinity of from 400 to 420 nm. Preferably, its content is at most 1.5 parts by weight, per 100 parts by weight of the base component.

$CeO_2$ is not essential, but may be incorporated as an ultraviolet ray absorbing component to the glass having the above compositional range, within a range of from 0 to 0.8 part by weight, per 100 parts by weight of the base component. However, in an application where the glass is exposed under strong ultraviolet rays, $CeO_2$ may cause solarization, and it should not substantially be contained, i.e. should not exceed a level of an impurity.

$TiO_2$ and $CeO_2$ are expensive materials, and their contents may be selected to meet the ultraviolet ray absorbing ability required for the particular application of glass.

From the foregoing, in the glass of the present invention, the coloring components preferably consist essentially of from 0.08 to 0.2 part by weight of total iron as calculated as $Fe_2O_3$, from 0.05 to 0.2 part by weight of vanadium as calculated as $V_2O_5$, from 0.0005 to 0.01 part by weight of Se, from 0 to 0.005 part by weight of CoO, from 0 to 2.0 parts by weight of $TiO_2$, and from 0 to 0.8 part by weight of $CeO_2$, per 100 parts by weight of the base component consisting of soda lime silicate glass.

The soda lime silicate glass as the base component preferably comprises:

| | | |
|---|---|---|
| $SiO_2$ | 65 | to 75 wt %, |
| $Al_2O_3$ | 0.1 | to 5 wt %, |
| $Na_2O$ | 10 | to 18 wt %, |
| $K_2O$ | 0 | to 5 wt %, |
| CaO | 5 | to 15 wt %, and |
| MgO | 1 | to 6 wt %. |

If $SiO_2$ is less than 65 wt %, the weather resistance tends to be poor, and if it exceeds 75 wt %, the viscosity tends to be high, and melting tends to be difficult. If $Al_2O_3$ is less than 0.1 wt %, the water resistance tends to be low, and if it exceeds 5 wt %, meltability tends to be low. $Na_2O$ and $K_2O$ are components which accelerate melting of starting materials. However, if $Na_2O$ is less than 10 wt %, such an effect is small, and if it exceeds 18 wt %, the weather resistance tends to be poor.

CaO and MgO are components which promote melting of starting materials and improve the weather resistance. However, if CaO is less than 5 wt %, such effects are small, and if it exceeds 15 wt %, devitrification is likely to result. If MgO is added in a small amount, the above effects will increase, and therefore it is incorporated in an amount of at least 1 wt %. However, if it exceeds 6 wt %, devitrification is likely to result.

When Glauber's salt is used as a refining agent, as its residue, $SO_3$ will remain in glass in an amount of from 0.05 to 1 wt %. Further, a nitrate may be used also as a refining agent. The nitrate has an oxidizing effect and thus serves to help Se remain in the glass base material. In this case, no substantial trace of nitrate ions will remain in the base component. Further, coke may be incorporated to adjust the reduction ratio of glass.

The glass of the present invention preferably has a dominant wavelength within a range of from 570 to 590 nm as measured by illuminant C. Within this range, a glass which exhibits a brown color or gray color equivalent to conventional glass for buildings or vehicles, can be obtained. More preferably, the dominant wavelength is from 575 to 585 nm as measured by illuminant C.

For the same reason, the excitation purity is preferably from 1 to 15% as measured by illuminant C when the glass has a thickness of from 2 to 15 mm. According to the present invention, it is possible to lower the excitation purity while maintaining a relatively high visible ray transmittance and to obtain brownish gray colored glass. The excitation purity of such glass is preferably from 1 to 12%, more preferably from 1 to 10%, as measured by illuminant C.

Further, the glass of the present invention preferably has a solar radiation transmittance of at most 75%, more preferably at most 70%, when it has a thickness of from 3 to 5 mm, so as to increase the air cooling effect by an air conditioner in a room or in a car.

Further, to prevent deterioration of furnitures or interior articles in a room or in a car by ultraviolet rays, the ultraviolet ray transmittance as stipulated in ISO 9050 is preferably at most 15%, when the glass has a thickness of from 3 to 5 mm. More preferably, the ultraviolet ray transmittance as stipulated in ISO 9050 is at most 10%, most preferably at most 6%.

When the glass of the present invention is used for buildings, the glass preferably has an excitation purity of from 4 to 15% and a dominant wavelength of from 570 to 590 nm, as measured by illuminant C, when it has a thickness of from 2 to 15 mm which is suitably selected depending upon the site at which it is attached.

On the other hand, if it is used as a window glass for vehicles, the glass preferably has an excitation purity of from 1 to 12%, more preferably from 1 to 10%, as measured by illuminant C, an ultraviolet ray transmittance of at most 10% and a visible ray transmittance of at least 70%, as measured by illuminant A, when it has a thickness of from 3 to 5 mm which is suitably selected depending upon the site where it is attached. Thus, when the glass of the present invention is used as a window glass for vehicles, the following glass sheet is preferred.

Namely, it has a thickness of from 2.5 to 6 mm, mostly from 3 to 5 mm, a visible ray transmittance of at least 70%, a solar radiation transmittance of at most 75%, more preferably at most 70%, an ultraviolet ray transmittance of at most 15%, more preferably at most 10%, and an excitation purity of from 1 to 12%, more preferably from 1 to 10%, as measured by illuminant C.

When the glass of the present invention is used as a laminated glass, as the thickness of glass sheets to be laminated is usually from 1.8 to 2.5 mm, the thickness of the laminated glass having a pair of such glass sheets laminated will be from 3.6 to 5.0 mm. Accordingly, so long as the optical properties of such a laminated glass satisfy the above ranges, such a laminated glass falls within the preferred range of the glass sheet of the present invention.

Throughout this specification, the solar radiation transmittance and the visible ray transmittance were obtained in accordance with JIS R 3106, and the ultraviolet ray transmittance was obtained in accordance with ISO 9050. Further, the visible ray transmittance was measured by using illuminant A, and the dominant wavelength and the excitation purity were measured by using illuminant C.

The colored glass of the present invention can be produced, for example, as follows, although the method is not limited to such a specific manner.

Mixed starting materials are continuously supplied to a melting furnace and heated and vitrified at a temperature of about 1500° C. by heavy oil or the like. Then, this molten glass is refined and then formed into a glass sheet having a predetermined thickness by a float process or the like. Then, this glass sheet is cut into a predetermined size to obtain the glass of the present invention. Then, the cut glass may be subjected to reinforcing treatment, may be processed to a laminated glass or may be processed to a multilayered glass, as the case requires.

Now, the present invention will be described in further detail with reference to Examples. However, it should be understood that the present invention is by no means restricted to such specific Examples.

EXAMPLES 1 to 11

A formulated batch was melted in a practical furnace atmosphere ($O_2$ concentration: about 2%), and a sheet glass was prepared by casting the molten glass on a carbon plate. As raw materials, silica sand, feldspar, dolomite, soda ash, Glauber's salt, sodium nitrate, sodium selenite, ferric oxide, vanadium pentoxide, cerium dioxide, titanium dioxide and cobalt oxide were used. In Table 1, the composition of coloring components contained in such glass is given (unit: parts by weight, per 100 parts by weight of the base component). Further, EXAMPLES 10 and 11 are Comparative Examples.

The composition of soda lime silicate glass as the base component was as follows.

In Examples 1 to 7 and 9, sodium nitrate was used as a refining agent, and the base component comprised 73.0 wt % of $SiO_2$, 1.7 wt % of $Al_2O_3$, 7.9 wt % of CaO, 3.9 wt % of MgO, 13.0 wt % of $Na_2O$ and 0.7 wt % of $K_2O$.

In Examples 8, 10 and 11, Glauber's salt was used as a refining agent, and the base component comprised 72.0 wt % of $SiO_2$, 1.7 wt % of $Al_2O_3$, 7.9 wt % of CaO, 4.1 wt % of MgO, 13.4 wt % of $Na_2O$, 0.7 wt % of $K_2O$ and 0.1 wt % of $SO_3$.

With respect to each glass, the solar radiation transmittance, the visible ray transmittance, the dominant wavelength and the excitation purity were obtained in accordance with JIS R 3106, and the results are shown in the columns for $T_E$ (%), $T_{VA}$ (%), $D_W$ (nm) and $P_e$ (%), respectively, in Table 2. $T_{370}$ (%) is a transmittance of an ultraviolet ray with a wavelength of 370 nm, Tuv (%) is an ultraviolet ray transmittance calculated in accordance with ISO 9050. Further, the values for Tuv and $T_{370}$ are calculated as of a thickness of 3.5 mm, and the values for the rest are calculated as of a thickness of 5 mm. The contents of coloring components were measured by X-ray fluorescence spectrometer.

Thus, the glass of the present invention has a high ultraviolet ray absorbing ability and a relatively high visible ray transmittance and exhibits a brown or gray color tone similar to current colored sheet glass for buildings and vehicles, and it is a glass having a relatively low excitation purity and solar radiation transmittance.

On the other hand, with the glass of Example 10, the ultraviolet ray transmittance is not sufficiently small, since the content of vanadium is small. Further, with the glass of Example 11, the dominant wavelength is short, and a brown color is not obtained, since it contains no selenium.

TABLE 1

| Example No. | $Fe_2O_3$ | $V_2O_5$ | Se | CoO | $TiO_2$ | $CeO_2$ |
|---|---|---|---|---|---|---|
| 1 | 0.080 | 0.11 | 0.0012 | 0.0000 | 0.02 | 0.00 |
| 2 | 0.085 | 0.11 | 0.0212 | 0.0030 | 0.02 | 0.00 |
| 3 | 0.105 | 0.14 | 0.0207 | 0.0020 | 0.02 | 0.00 |
| 4 | 0.100 | 0.17 | 0.0042 | 0.0020 | 0.02 | 0.00 |
| 5 | 0.101 | 0.18 | 0.0210 | 0.0020 | 0.02 | 0.00 |
| 6 | 0.143 | 0.10 | 0.0011 | 0.0000 | 0.02 | 0.00 |
| 7 | 0.101 | 0.20 | 0.0030 | 0.0020 | 2.00 | 0.00 |
| 8 | 0.188 | 0.09 | 0.0151 | 0.0000 | 0.02 | 0.40 |
| 9 | 0.149 | 0.11 | 0.0121 | 0.0030 | 0.02 | 0.00 |
| 10 | 0.080 | 0.03 | 0.0027 | 0.0000 | 0.00 | 0.00 |
| 11 | 0.020 | 0.14 | 0.0000 | 0.0035 | 0.00 | 0.00 |

TABLE 2

| Example No. | $T_E$ | $T_{va}$ | $D_W$ | $P_e$ | $T_{uv}$ | $T_{370}$ |
|---|---|---|---|---|---|---|
| 1 | 73.1 | 77.9 | 575.5 | 7.2 | 9.3 | 25.4 |
| 2 | 73.8 | 70.3 | 579.5 | 2.2 | 7.2 | 18.6 |
| 3 | 73.0 | 71.6 | 578.1 | 5.3 | 5.8 | 14.8 |
| 4 | 68.9 | 68.9 | 579.6 | 6.4 | 5.1 | 13.3 |
| 5 | 72.5 | 70.8 | 571.7 | 2.8 | 4.4 | 11.2 |
| 6 | 64.6 | 71.2 | 575.3 | 10.9 | 10.9 | 27.8 |
| 7 | 68.4 | 68.5 | 577.4 | 9.2 | 3.8 | 9.8 |
| 8 | 74.3 | 80.0 | 573.7 | 6.5 | 9.3 | 26.4 |
| 9 | 70.6 | 68.9 | 578.5 | 7.3 | 5.3 | 13.9 |
| 10 | 81.5 | 82.1 | 574.5 | 5.6 | 19.2 | 43.5 |
| 11 | 71.6 | 72.9 | 489.0 | 4.7 | 9.3 | 25.4 |

The glass of the present invention has a high visible ray transmittance and absorbs ultraviolet rays, and it is effective to prevent deterioration such as color fading of interior materials by ultraviolet rays or to prevent sunburn of a person who is inside. Accordingly, it is expected to be particularly useful as a window glass for buildings or vehicles. Further, it scarcely undergoes color change by ultraviolet rays, and the color tone will not change even if it is used over a long period of time. Further, the glass melting process such as a refining step in a float glass production process can be carried out in the same manner as of the conventional operation.

What is claimed is:

1. Ultraviolet ray absorbing colored glass, which comprises 100 parts by weight of a base component consisting of soda lime silicate glass and coloring components consisting essentially of from 0.08 to 0.4 part by weight of total iron as calculated as $Fe_2O_3$, from 0.05 to 0.4 part by weight of vanadium as calculated as $V_2O_5$, from 0.0005 to 0.03 part by weight of Se, from 0 to 0.005 part by weight of CoO, from 0 to 2.0 parts by weight of $TiO_2$ and from 0 to 0.8 part by weight of $CeO_2$.

2. The ultraviolet ray absorbing colored glass according to claim 1, which comprises 100 parts by weight of a base component consisting of soda lime silicate glass and coloring components consisting essentially of from 0.08 to 0.2 part by weight of total iron as calculated as $Fe_2O_3$, from 0.05 to 0.2 part by weight of vanadium as calculated as $V_2O_5$, from 0.0005 to 0.01 part by weight of Se, from 0 to 0.005 part by weight of CoO, from 0 to 2.0 parts by weight of $TiO_2$ and from 0 to 0.8 part by weight of $CeO_2$.

3. The ultraviolet ray absorbing colored glass according to claim 2, which is substantially free of $CeO_2$.

4. The ultraviolet ray absorbing colored glass according to claim 1, which is substantially free of $CeO_2$.

5. The ultraviolet ray absorbing colored glass according to claim 4, which has a dominant wavelength of from 570 to 590 nm as measured by illuminant C and which has a brown color or a gray color.

6. The ultraviolet ray absorbing colored glass according to claim 5, which has a dominant wavelength of from 575 to 585 nm as measured by illuminant C.

7. The ultraviolet ray absorbing colored glass according to claim 4, which has an excitation purity of from 1 to 15% as measured by illuminant C as of a thickness of from 2 to 15 mm.

8. The ultraviolet ray absorbing colored glass according to claim 7, which has an excitation purity of from 1 to 12% as measured by illuminant C as of a thickness of from 2 to 15 mm.

9. The ultraviolet ray absorbing colored glass according to claim 4, which has a solar radiation transmittance of at most 75% as of a thickness of from 3 to 5 mm.

10. The ultraviolet ray absorbing colored glass according to claim 4, which has an ultraviolet ray transmittance of at most 15% as stipulated in ISO 9050 as of a thickness of from 3 to 5 mm.

11. The ultraviolet ray absorbing colored glass according to claim 10, which has an ultraviolet ray transmittance of at most 10% as stipulated in ISO 9050 as of a thickness of from 3 to 5 mm.

12. The ultraviolet ray absorbing colored glass according to claim 4, wherein the soda lime silicate glass as the base component comprises the following components:

| | | |
|---|---|---|
| $SiO_2$ | 65 | to 75 wt %, |
| $Al_2O_3$ | 0.1 | to 5 wt %, |
| $Na_2O$ | 10 | to 18 wt %, |
| $K_2O$ | 0 | to 5 wt %, |
| CaO | 5 | to 15 wt %, and |
| MgO | 1 | to 6 wt %. |

13. The ultraviolet ray absorbing colored glass according to claim 4 for buildings, which has an excitation purity of from 4 to 15% and a dominant wavelength of from 570 to 590 nm as measured by illuminant C, as of a thickness of from 2 to 15 mm.

14. The ultraviolet ray absorbing colored glass according to claim 4 for vehicles, which has an excitation purity of from 1 to 12 wt % as measured by illuminant C, an ultraviolet ray transmittance of at most 10% as stipulated in ISO 9050 and a visible ray transmittance of at least 70% as measured by illuminant A, as of a thickness of from 3 to 5 mm.

15. The ultraviolet ray absorbing colored glass according to claim 14, which has an excitation purity of from 1 to 10% as measured by illuminant C.

16. A glass sheet for vehicles, which is made of the ultraviolet ray absorbing colored glass of claim 4 and has a thickness of from 2.5 to 6 mm, and which has an excitation purity of from 1 to 12% as measured by illuminant C, an ultraviolet ray transmittance of at most 15% as stipulated in ISO 9050, a solar radiation transmittance of at most 75%, and a visible ray transmittance of at least 70% as measured by illuminant A.

17. A glass sheet for vehicles according to claim 16, which has a solar radiation transmittance of at most 70%.

18. The glass sheet for vehicles according to claim 16, which has an ultraviolet ray transmittance of at most 10% as stipulated in ISO 9050.

19. The glass sheet for vehicles according to claim 16, which has an excitation purity of from 1 to 10% as measured by illuminant C.

* * * * *